Patented Aug. 28, 1934

1,971,507

UNITED STATES PATENT OFFICE 1,971,507

PROCESS FOR THE CONVERSION OF RESITOLES AND RESITES INTO OIL-SOLUBLE PRODUCTS

Fritz Seebach, Erkner, near Berlin, Germany, assignor to Bakelite Gesellschaft mit beschrankter Haftung, Berlin, Germany No Drawing. Application March 21, 1930, Serial No. 437,945. In Germany May 6, 1929

7 Claims. (Cl. 260—4)

In a prior Patent No. 1,809,732 dated June 9, 1931 a process is described for converting phenol-aldehyde condensation products that are in a soluble and fusible condition (resoles or novolaks) into products soluble in linseed, tung and other fatty oils by fusing them with monohydric or polyhydric phenols having more than one nucleus. Phenols mentioned as suitable for this purpose include α-naphthol, β-naphthol, diphenols, dihydroxydibenzyl, dicresols, dithymols, dicarvacrols, dinaphthols and their homologues, resorcin and its homologues; compounds of the specified phenols, as the compound of β-naphthol and acetamid, may be used. The process can also be carried out with the use of catalysts, as for example hydrated oxide of manganese or lead oxide, alone or in admixture with each other, in order to facilitate and accelerate the action of the phenols upon the condensation products.

It has likewise been found that phenol-aldehyde resins that have been polymerized or transformed to the "B" or "C" condition (resitoles or resites) can be converted into oil-soluble products by following the process as described in the prior application. Phenols of the dihydroxyphenyl type are found to be most suitable for the treatment of resites.

As an illustration one can proceed as follows: equal parts of hardened resin (in the so-called "C" condition) and 2, 2 dihydroxydiphenyl (diphenol) are heated together until the resin is dissolved and no more water vapor is driven off. The resulting new product is readily soluble in hot fatty oils. The process can also be carried out in the presence of catalysts. Compounds which are used in the manufacture of varnish in order to accelerate the drying or the formation of varnish, may be employed as catalyzing agents as for instance hydrated oxide of manganese, lead oxide, alone or mixed with each other. Instead of heating a hardened phenol condensation product alone with the phenol a phenol-aldehyde condensation product in the "A" or "B" condition can be included. For example a resin in the "C" condition is finely ground and kneaded at a low temperature, say about 80° C., with a resin in the "A" condition and the mass is then subjected to the above described fusion.

The preparation of oil-soluble condensation products from resitoles follows in a manner similar to that used in connection with resoles in that the resins in the "B" condition are fused with polynuclear phenols, particularly with the use of catalysts, as described above.

I claim:

1. Process of preparing resinous products characterized by solubility in fatty oils which comprises heating a substantially completely polymerized phenol-aldehyde condensation product with a phenol having more than one nucleus.

2. Process of preparing resinous products characterized by solubility in fatty oils which comprises heating a substantially completely polymerized phenol-aldehyde condensation product with a phenol having more than one nucleus in the presence of a metal oxide catalyst.

3. Process of preparing resinous products characterized by solubility in fatty oils which comprises heating a polymerized phenol-aldehyde condensation product with a dihydroxydiphenyl.

4. Process of preparing resinous products characterized by solubility in fatty oils which comprises heating a polymerized phenol-aldehyde condensation product with a dihydroxydiphenyl in the presence of manganese dioxide.

5. A composition of matter comprising the reaction product of a polynuclear phenol and a substantially completely polymerized phenol-aldehyde condensation product, said composition being soluble in a fatty oil.

6. A composition of matter comprising the reaction product of a hydroxydiphenyl and a polymerized phenol-aldehyde condensation product, said composition being soluble in fatty oils.

7. Process of preparing a resinous product, characterized by solubility in fatty oils, which comprises heating a substantially completely polymerized phenol-aldehyde condensation product with a phenol having more than one nucleus, in the presence of a catalytic agent effective in accelerating the reaction between the condensation product and the phenol.

FRITZ SEEBACH.